United States Patent Office 3,539,673
Patented Nov. 10, 1970

3,539,673
VINYL PLASTISOL MOLDING AND PAINTING METHOD
James C. Poole, Iowa City, Iowa, and Lawrence D. Cercone, Logan, Ohio, assignors to Sheller-Globe Corporation, Detroit, Mich., a corporation of Ohio
No Drawing. Filed Nov. 21, 1968, Ser. No. 777,909
Int. Cl. B29c 5/12; B44d 1/092
U.S. Cl. 264—129
6 Claims

ABSTRACT OF THE DISCLOSURE

A method of preparing molded items from formulations such as a vinyl plastisol, vinyl organosol, or vinyl dry sol, wherein the method comprises the steps of (a) incorporating at least one silicone fluid into the formulation, with said silicone fluid being of a specific type which will provide facilitated mold release to the molded item, and which fluid is also operative to enable an acceptable compatibility between the molded item and subsequently applied paint coatings, (b) subsequently placing the vinyl formulation into a mold, (c) heating the formulation to a predetermined temperature, (d) maintaining said temperature for a predetermined time period, and (e) subsequently removing the molded item from the mold; and, the product produced by the above method.

BACKGROUND OF THE INVENTION

This invention broadly relates to the molding of vinyl formulations. More specifically the invention relates to the molding of items from vinyl plastisols.

The state of the prior art patents which generally form the background behind this invention and which were developed through a preliminary examination prior to filing application for patent is represented by the following U.S. Pat. Nos.: 2,090,617; 2,375,007; 2,467,708; 2,470,772; 2,473,495; 2,475,194; 2,478,229; 2,482,307; 2,484,483; 2,520,173; 2,527,793; 2,558,584; 2,593,827; 2,644,802; 2,752,638 and French Pat. No. 1,499,845.

Conventionally in the past those skilled in the art of vinyl plastisol technology have molded various items from vinyl plastisols at elevated temperatures. Subsequent to the molding of such items from vinyl plastisols there has essentially always been a problem of properly removing the molded item from the mold without tearing and/or distortion of the item during removal thereof from the mold. Attempted solutions to this problem in the past have been directed toward applying, painting or spraying various mold release agents on the interior mold wall surface. While such a solution of the problem has to a certain extent led to satisfactory molded items which can be removed from the mold with an acceptable minimum of tearing and/or distortion, there has at the same time accompanied this solution a concurrent problem to the effect that after the molded item was removed from the mold it was generally necessary to clean off the mold release agent on the exterior of the item, and it was also necessary that substantial care be taken in properly applying the mold release agent to the interior mold wall such that it was evenly distributed, etc. However, until the present invention the above constituted the accepted technique of obtaining proper mold release of molded items made from vinyl plastisols or like formulations.

It should furthermore be stated that in the past there has been great hesitancy if not total disregard toward incorporating any mold release agents into the actual vinyl formulation prior to molding thereof for the reason that if the subsequently molded vinyl part were intended to be painted, then the incorporation in the vinyl formulation of any release agent substantially ruined the desired adherent property required in applying any such paint coatings to the molded vinyl part. Moreover if the mold release agent were incorporated into the vinyl formulation this problem of obtaining the desired adherent paint on the surface of the subsequently molded vinyl part could not be overcome by cleaning the surface of the molded part, that is, by solvent washing, etc., for the reason that the mold release agent was in effect more or less homogeneously distributed throughout the composition of the molded vinyl part and therefore could not be purged from the surface thereof as was the case when the mold release agent was simply applied to the interior mold wall and therefore only made contact with the exterior surface of the molded vinyl part and not the interior composition thereof.

Accordingly in view of the above it is a primary object of the present invention to provide an improved method of molding various items from vinyl formulations, specifically vinyl plastisols and also vinyl organosols and vinyl dry sol type compositions.

Another object of the present invention is to provide an improved method of preparing molded items from vinyl formulations wherein a specific silicone fluid, described hereinafter, is incorporated into the vinyl formulation prior to molding thereof for the purpose of providing the molded vinyl part with the property of highly facilitated mold release while at the same time enabling the said molded vinyl part to accept a subsequently applied paint coating if desired.

Another object of the present invention is to provide an improved method of preparing molded items from vinyl formulations wherein a silicone fluid is incorporated into the vinyl formulation prior to molding, with said silicone fluid being comprised of a polysiloxane polymer which provides facilitated mold release to the molded item and which is also operative to enable acceptable compatibility of the molded item to a subsequently applied paint coating.

Still another object of the present invention is to provide an improved method of preparing molded items from vinyl formulations wherein said vinyl formulation includes a silicone fluid comprised essentially of a polymer material having a structural formula as disclosed hereinafter.

Other objects, features and advantages of the present invention will become apparent from the subsequent description and the appended claims.

SUMMARY OF THE INVENTION

Briefly stated the present invention comprises a method of preparing molded items from a formulation of vinyl plastisol, vinyl organosol, or vinyl dry sol, said method comprising the steps of: (A) incorporating at least one silicone fluid into said formulation, said silicone fluid being comprised of a polysiloxane polymer material means for providing facilitated mold release to the molded item and also operative to enable acceptable compatibility of the molded item to subsequently applied paint coating, said silicone fluid being present in the formulation within the range of about 1/50% to about 6% by weight of the formulation, (B) subsequently placing the formulation into a mold, (C) heating the formulation to a temperature within the range of at least 230° F. up to a maximum of about 750° F., (D) maintaining said temperature for a time period of about 1/4 minute up to about 2 hours, and (E) subsequently removing the molded item from the mold, said silicone fluid used in said method being capable of generally withstanding temperatures within said above range, said silicone fluid being resistant to oxidation and break down during molding; and, a product produced by the above method.

DESCRIPTION OF PREFERRED EMBODIMENTS

The silicone fluid described hereinabove broadly stated should be incorporated into the vinyl formulation within the range of about 1/50% to about 6% by weight of the formulation. Preferably this amount should be within the range of about 1/2% to about 3% by weight and, best results have been obtained using approximately 1% by weight of the silicone fluid in the vinyl formulation.

It is of course conventional to include in the vinyl formulation herein small amounts of additional materials such as coloring pigments, other fillers, etc.

The silicone fluid for use in this invention broadly should be comprised of a polysiloxane polymer which is capable of providing facilitated mold release to the molded item and which is also operative to enable acceptable compatibility of the molded item to a subsequently applied paint coating.

From an intermediate standpoint the silicone fluid for use in this invention should be a polysiloxane polymer which contains within its polymeric structure a substantial number of alkyl aryl side groups.

From a preferred standpoint the silicone fluid used in this invention should be a polymeric compound consisting essentially of: (a) siloxane links of the formula:

in which R is chosen from among n-alkyl radicals containing more than 7 carbon atoms; and consisting of (b) siloxane links of the formula:

in which R' represents a 2-phenylpropyl radical or a 2-phenylethyl radical. R may be any n-alkyl radical having more than 7 carbon atoms, such as the octyl, nonyl, decyl, dodecyl, tetradecyl, hexadecyl and octadecyl radicals. For the present invention however it is preferable that the radical shall contain an average of 10 to 14 carbon atoms. R' should be a 2-phenylpropyl or 2-phenylethyl radical. The expression "consisting essentially of" is intended to mean that small quantities of foreign links and of impurities may be present in the compound of the present invention, provided that they are not detrimental when the compound is used for its purpose herein.

Silicone fluids or polymers of the type referred to above can be prepared (as described in French Pat. 1,499,845) by the reaction of appropriate quantities of alpha-olefins with a methylhydrogenopolysiloxane. The reaction is catalyzed by a platinum catalyst. A mixture of alpha-olefins, or an appropriate individual alpha-olefin, is added to methylhydrogenosiloxane so as to maintain the temperature between 120° C. and 150° C. The mixture is then heated in a spherical flask, equipped with an agitator, a condenser, a thermocouple, a supplying funnel, and a nitrogen inlet, during another hour. The resultant product has the general formula:

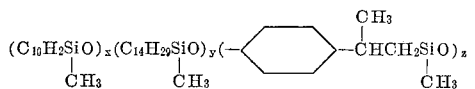

when the alpha-olefins mixture consists of decane-1, tetradecane-1, and alphamethylstyrene, which product is one of the compounds of the present invention.

In the above formula $z$ may range from 20 to 60 moles, and consequently $x$ and $y$ may be comprised between 40 and 80 moles.

The following constitute appropriate alpha-olefins for obtaining the particular R and R' groups disclosed hereinabove.

| Alpha-olefin | R group |
|---|---|
| Decame-1 | decyl |
| Tetradecane-1 | tetradecyl |
| Octane-1 | octyl |
| Octadecane-1 | octadecyl |
| $CH_2=CHCH(CH_2)_4CH_3$<br>$\quad\ \ \ \|$<br>$\quad\ \ CH_3$ | 3-methyloctyl |
| $CH_2=CHCHCH_2(CH_2)_5CH_3$<br>$\quad\quad\quad\ \|$<br>$\quad\quad\quad C_4H_9$ | 4-butyldecyl |
| Heptane-1 | |

| | R' group |
|---|---|
| Alpha-methylstyrene | 2-phenylpropyl |
| Styrene | 2-phenylethyl |
| Vinyl-toluene | 2-tolylethyl |
| Xenyl-ethylene | 2-xenylethyl |

The following Examples A and B are illustrative of the preparation of preferred siloxane polymer materials pursuant to the description hereinabove.

Example A: In a flask of 250 cc. volume, equipped with an agitator, a condenser, a thermo-couple, and a supply funnel and an inlet for nitrogen, there is heated 61.9 grams of a fluid previously prepared by adding, in the presence of a platinum catalyst, 371.0 grams of alpha-methyl styrene (30 moles) to 628.8 grams of methylhydrogenopolysiloxane. A mixture of 38.1 grams of decane-1 and 53.4 grams of tetradecane-1 is added at a rate suitable for maintaining the temperature between 120° C. and 150° C. The solution is heated for another hour, and there is obtained the following product:

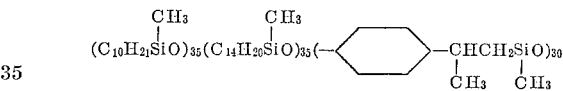

This compound has the following properties:

The percentage of SiH is $6.3 \times 10^{-3}$;
The viscosity at 25° C. is 633 cp.;
Congealation point: −27° C.;
Aniline point: 515° C.;
Paintability: 4. (1=excellent; 7=mediocre).
Unctuosity: 5.5 hours.

Example B: The method of preparation is identical with that used in Example A. A mixture of 40.7 grams of decane-1 and 571.1 grams of tetradecane-1 is added to 59.5 grams of a fluid prepared by the addition, in the presence of a platinum catalyst, of 354 grams of alpha-methylstyrene to 900 grams of methylhydrogenopolysiloxane. There is obtained the following product:

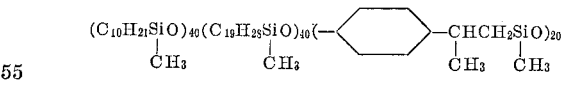

This compound has the following properties:

Percentage of SiH is $1.95 \times 10^{-3}$;
The viscosity at 25° C. is 1444 cp.;
Congealation point: −21° C.;
Aniline point: 168° C.;
Paintability; 4;
Unctuosity: good.

The method of incorporation of the silicone fluid into the vinyl formulation is as follows. Generally and preferably the silicon fluid used in the invention is incorporated into the vinyl formulation as the last step of formulating the vinyl plastisol, or other vinyl formulations such as an organosol or dry sol. Subsequent to this incorporation the vinyl formulation is mixed thoroughly and then it has been found best to use the vinyl formulation with the incorporated silicone fluid essentially immediately after the mixing. However broadly it is not necessary that the mix be immediately used and no limitation to the immediate use should be implied from this disclosure.

The vinyl formulations intended for use herein may be of many types. Preferably this invention is applicable to vinyl plastisols and particularly polyvinyl chloride plastisols. Other vinyli formulations to which this invention is applicable are vinyl organosols and vinyl dry sols.

Various molding techniques may be used for preparing molded items from the vinyl formulations of the type disclosed herein, and these molding techniques may suitably be categorized as slush molding, rotational molding or casting, and what may be termed melt-flow molding as applied to a vinyl dry sol formulation.

The method of molding vinyl formulations in accordance with this invention is described hereinafter, however, it should be understood that certain steps in the method disclosed herein may be sequentially interchangeable and no limitation should be inferred from the disclosure herein of carrying out the method steps in a particular sequential order.

An illustrative and somewhat specific disclosure of the method of preparing molded items in accordance with the disclosure herein is as follows. First the mold to be used in molding the molded item is charged with the vinyl formulation and then the mold is covered with a mold lid. Second the mold is heated, for example in an oven or any other suitable heating means, to a predetermined temperature and for a predetermined time period as specifically set forth hereinabove. With reference to the molding temperatures disclosed herein it should be understood that the specific temperatures disclosed relate to the temperature to which the vinyl formulation itself should be heated during molding. The time period preferred to herein generally relates to the residence time of the vinyl formulation in a heated condition regardless of whether the heating takes place in an oven or in the environment of any other suitable heating means. Third the molded item within the mold is cooled in order to facilitate subsequent removal of the item from the mold. Fourth the molded item is then removed from the mold, and pursuant to the disclosure hereinabove this removal is made with the substantial and essentially complete absence of tearing and/or distortion of the molded item during removal thereof from the mold.

Optional steps of the method which generally follow those set forth above are as follows.

The molded item after removal from the mold may be subjected to one or more paint coatings in order to provide the molded item with a pleasing and attractive surface finish appearance.

Rather than painting the molded item directly after it is removed from the mold a cellular or foam-like material (such as urethane foam or the like) may be inserted into or filled within the molded item and, subsequent to this inserting or filling operation then the molded vinyl item can be subjected to the application of at least one or more paint coatings.

The molding temperature referred to hereinabove broadly stated should be within the range of about 230° F. up to about 750° F. Preferably this temperature should be within the range of about 300° F. up to about 500° F.; and, best results have been obtained when this temperature is within the range of from about 350° F. to about 400° F. It should be understood that the molding temperatures just related are critically important to and inextricably connected with successful practice of the invention disclosed herein for the following reasons. First the silicon fluid used herein must be one which will withstand the minimum temperatures which occur during molding of the vinyl formulations. The silicon fluids described hereinabove are ones which satisfactorily fulfill this criteria. Next the minimum temperature disclosed hereinabove is one below which the vinyl resin material of the vinyl formulation will not properly be thermally activated such that during molding of the vinyl formulation there would be produced a satisfactory and acceptable molded item.

The molding time or residence time described hereinabove should broadly be within the range of about ¼ minute up to about 2 hours or more. This broad upper limit is not highly important for the reason that if a mold wall having extremely thick and generally nonconductive properties is chosen then the residence time might be relatively long, however, from a commercial and practicable standpoint the molding operation described herein is essentially always carried out at residence times of less than 2 hours. Preferably the molding time should be within the range of about ½ minute up to about 20 minutes.

In order to further illustrate the invention, the following examples are provided. It is to be understood, however, that the examples are included for illustrative purposes and are not intended to be limiting of the scope of the invention as set forth in the subjoined claims.

EXAMPLE 1

A polyvinyl chloride plastisol was prepared using the following formulation—

Part I:                                                        Parts by weight
   (1) Vinyl dispersion resin (high mol. wt. polyvinyl chloride resin, VR–50 available from Uniroyal) _____ 43.6
   (2) Geon—120 (B. F. Goodrich Co.) _____ 29.1
   (3) VR–10 (extender resin of polyvinyl chloride type with high mol. wt. _____ 18.2
   (4) VC–260C (Borden Chemical Co.) _____ 9.1
                                                        100.0

Part II:
   Plasticizer, in ratio of 2:1 DIDP to NDOP __ 33.6
   (1) DIDP (diisodecylphthalate).
   (2) NDOP (n-decyl octylphthalate).
Part III—Secondary plasticizers:
   (1) Epoxy tallate _____ 18.2
   (2) DIDA (diisodecyladipate) _____ 9.1
PART IV—Stabilizer:
   (1) Ferro–5862 (Ferro Corp.) calcium-zinc stabilizer _____ 5.0

Total of I–IV _____ 165.9

To three separate quantities comprising 100 parts of the above plastisol formulation there was added and mixed thoroughly therein, respectively (1) ½ part by weight of silicone fluid SF–1080
(2) 1 part by weight of silicone fluid SF–1080
(3) 2 parts by weight of silicone fluid SF–1080 to make three separate batches of the formulation. SF–1080 is a silicone fluid (available from General Electric Co.) having the following properties:

Property:                                                          SF–1080
1. Silicone content percent _____ 100
2. Weight per gallon (lbs.) _____ 8.6
3. Viscosity at 25° C. (cps.) _____ 1500
4. Color _____ Lt. yellow
5. Flash point (° F., open cup) _____ 580
6. Storage stability _____ Indefinite The above three separate vinyl formulations were then charged into three dry, clean molds, and the molds were inserted into an oven at a temperature of about 500° F. for a time period of about 4 minutes. Subsequent to this molding operation the molds were cooled to about room temperature and the three molded items were then removed from the molds without difficulty of tearing and/or distortion accompanying the removal. Furthermore the molded items so produced possessed surface characteristics which were compatible to subsequently applied paint coatings.

EXAMPLE 2

The same procedure as in Example 1 was followed except that silicone fluid SF-1066 (available from General Electric Co.) was incorporated into the vinyl formulation; and substantially identical results and physical characteristics relative to the molded items were achieved.

EXAMPLE 3

The same procedure as in Example 1 was followed except that silicone fluid SF-1100 (available from General Electric Co.) was incorporated into the vinyl formulation; and substantially identical results and physical characteristics relative to the molded items were achieved.

EXAMPLE 4

The same procedure as in Example 1 was followed except that silicone fluid Y-5042 (available from Union Carbide Corp.) was incorporated into the vinyl formulation; and substantially identical results and physical characteristics relative to the molded items were achieved.

Y-5042 is a silicone fluid having the following properties:

Solids, percent: 5.0
Color: Colorless
Viscosity, 25° C., cst.: 1
Specific gravity, 25° C.: 0.81
Flash point, ° F. closed cup: 50
Shelf life: Greater than 1 year While the advantageous nature of the above disclosed invention should be fairly apparent from the description hereinabove, this advantageous nature of the invention will be restated here. Specifically the invention disclosed herein allows, through the incorporation of a silicone fluid into a vinyl formulation which is subsequently to be molded, an unexpected and unique mold release of the molded vinyl item from the mold structure substantially in the complete absence of any tearing or distortion of the molded item. At the same time the invention allows that the molded vinyl item even though having surface characteristics which provide for satisfactory mold release, may at the same time be coated with one or more paint coatings which are adherent to the surface of the molded item without any special prior cleaning or surface preparations of the molded item being necessary.

What is claimed is:

1. A method of preparing molded items from a formulation selected from at least one of the group consisting of vinyl plastisol, vinyl organosol and vinyl dry sol said method comprising the steps of:

(A) incorporating at least one silicone fluid into said formulation,
said silicone fluid being comprised of a polysiloxane polymer material means which provides facilitated mold release to the molded item and is operative to enable acceptable adhesion of the molded item to subsequently applied paint coating,
said silicone fluid being present in the formulation within the range of about 1/50% to about 6% by weight of the formulation;

(B) subsequently placing the formulation into a mold, (C) heating the formulation to a temperature within the range of at least 230° F. up to a maximum of about 750° F.

(D) maintaining said temperature for a time period of about 1/4 minute up to about 2 hours, (E) subsequently removing the molded item from the mold, (F) painting said molded item,
said silicone used in said method being capable of generally withstanding temperatures within said above range,
said silicone fluid being resistant to oxidation and break down during molding, and
wherein said polymer contains in its structure a substantial number of alkylaryl side groups.

2. The method of claim 1 wherein said polymer material consists essentially of:

(a) links of the structural formula

wherein R is selected from n-alkyl radicals containing more than 7 carbon atoms, and (b) links of the structural formula

wherein R' is selected from the group consisting of a 2-phenylpropyl radical or a 2-phenylethyl radical.

3. The method of claim 1 wherein said
silicone fluid is present from about 1/2% to about 3% by weight.

4. The method of claim 1, wherein
said time period is between about 1/2 minute and about 20 minutes.

5. The method of claim 2 wherein
said temperature is between about 330° F. and about 500° F.

6. The method of claim 1, wherein,
said silicone fluid is present from about
1/2% to about 3% by weight,
said temperature is between about 300° F., and about 500° F.,
said time period is between about 1/2 minute and about 20 minutes.

References Cited

UNITED STATES PATENTS

| | | | |
|---|---|---|---|
| 2,470,772 | 5/1949 | Haas | 264—300 |
| 2,751,628 | 6/1956 | Carpenter et al. | 264—300 |
| 2,752,638 | 7/1956 | Anspon. | |
| 2,986,411 | 5/1961 | Anderson | 264—300 |

ROBERT F. WHITE, Primary Examiner

G. AUVILLE, Assistant Examiner

U.S. Cl. X.R.

117—72; 260—29.1; 264—300, 331